United States Patent
Wu et al.

(10) Patent No.: US 11,222,005 B1
(45) Date of Patent: Jan. 11, 2022

(54) PROACTIVE STORAGE SYSTEM CONFIGURATION CONSISTENCY VALIDATION

(71) Applicant: EMC IP Holding Company LLC, Hopkinton, MA (US)

(72) Inventors: Eric Wu, Shanghai (CN); Haitao Zhou, Shanghai (CN); Jun Wu, Shanghai (CN); Muzhar Khokhar, Shrewsbury, MA (US); Jiangping Sun, Shanghai (CN); Minqiang Wu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 576 days.

(21) Appl. No.: 15/652,517

(22) Filed: Jul. 18, 2017

(51) Int. Cl.
*G06F 16/23* (2019.01)
*G06F 8/656* (2018.01)
(Continued)

(52) U.S. Cl.
CPC .......... *G06F 16/2365* (2019.01); *G06F 8/656* (2018.02); *G06F 16/1748* (2019.01);
(Continued)

(58) Field of Classification Search
None
See application file for complete search history.

(56) References Cited

U.S. PATENT DOCUMENTS

| 2005/0074114 A1* | 4/2005 | Fotta | H04M 3/5158 379/266.08 |
| 2005/0125358 A1* | 6/2005 | Levin | G06Q 10/10 705/59 |

(Continued)

OTHER PUBLICATIONS

Release Notes 302-002-572, EMC Unity™ Family, EMC Unity™ All Flash, EMC Unity™ Hybrid, EMC Unity VSA™, V 4.1.2. 9257522, Apr. 2017, 44 pages.

(Continued)

*Primary Examiner* — Thu N Nguyen
(74) *Attorney, Agent, or Firm* — Muirhead and Saturnelli, LLC

(57) ABSTRACT

Techniques for proactively detecting configuration inconsistencies may include: receiving notification regarding an occurrence of a trigger event in a system, wherein the trigger event is one of a plurality of defined trigger events, and wherein the plurality of defined trigger events include one or more defined time periods; and responsive to receiving the notification, performing first processing including: capturing configuration information describing a current configuration of the system; and performing proactive consistency validation processing of the configuration information that detects inconsistencies between dependent entities of the current configuration. The proactive consistency validation processing may detect inconsistencies between dependent entities of the same type or different types. Metadata may identify dependencies between entities that may exist in a configuration. Responsive to detecting an inconsistency, a suitable action may be taken and/or user notified. The trigger events may include a user trigger, a critical event, and prior to performing an upgrade.

17 Claims, 9 Drawing Sheets

(51) Int. Cl.
*G06F 16/27* (2019.01)
*G06F 16/28* (2019.01)
*G06F 16/174* (2019.01)
*G06F 16/182* (2019.01)

(52) U.S. Cl.
CPC .......... *G06F 16/1827* (2019.01); *G06F 16/27* (2019.01); *G06F 16/288* (2019.01)

(56) References Cited

U.S. PATENT DOCUMENTS

| | | | | |
|---|---|---|---|---|
| 2006/0106728 | A1* | 5/2006 | Yellai | G06F 21/105 |
| | | | | 705/59 |
| 2007/0083588 | A1* | 4/2007 | Keller | G06F 9/5077 |
| | | | | 709/202 |
| 2007/0226149 | A1* | 9/2007 | McFarlin | G06Q 99/00 |
| | | | | 705/59 |
| 2009/0187453 | A1* | 7/2009 | Dill | G06Q 10/06 |
| | | | | 705/7.12 |
| 2013/0046740 | A1* | 2/2013 | Li | G06F 16/176 |
| | | | | 707/695 |
| 2013/0198734 | A1* | 8/2013 | Biswas | G06F 21/105 |
| | | | | 717/174 |
| 2014/0165053 | A1* | 6/2014 | Escobar-Olmos | G06F 8/61 |
| | | | | 717/178 |
| 2016/0179900 | A1* | 6/2016 | Stefik | G06Q 10/0637 |
| | | | | 707/771 |
| 2017/0228402 | A1* | 8/2017 | Kumar | G06F 16/215 |
| 2019/0384758 | A1* | 12/2019 | Liu | G06F 16/2365 |

OTHER PUBLICATIONS

Screenshot of the "Save Configuration" feature in the EMC Unity Family V 4.0.0.7329527 Release, May 2016, 1 page.

Online Help description of the "Save Configuration" feature in the EMC Unity Family V 4.0.0.7329527 Release, May 2016, 1 page.

* cited by examiner

US 11,222,005 B1

PROACTIVE STORAGE SYSTEM CONFIGURATION CONSISTENCY VALIDATION

BACKGROUND

Technical Field

This application generally relates to proactive configuration consistency processing and validation.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is a method of detecting configuration inconsistencies comprising: receiving notification regarding an occurrence of a trigger event in a system, wherein the trigger event is one of a plurality of defined trigger events, and wherein the plurality of defined trigger events include one or more defined time periods; and responsive to receiving the notification, performing first processing including: capturing configuration information describing a current configuration of the system; and performing proactive consistency validation processing of the configuration information that detects inconsistencies between dependent entities of the current configuration. The proactive consistency validation processing may include detecting inconsistencies between dependent entities of a same type. The proactive consistency validation processing may include detecting inconsistencies between a first license that depends on a second license. The proactive consistency validation processing may include detecting inconsistencies between any of: a deduplication license that depends on a file license; a data compression license that depends on a file license; a data compression license that depends on a thin or virtual provisioning license; a snapshot license that depends on a thin or virtual provisioning license; a file related feature or service license that depends on a file license; and a block related feature or service license that depends on a block license. The proactive consistency validation processing may include detecting inconsistencies between dependent entities each of a different type. The proactive consistency validation processing may include detecting inconsistencies between any of: a snapshot entity that depends on a logical device entity; a snapshot entity that depends on a file system entity; a replication entity that depends on a logical device entity; a server entity that depends on a pool entity; a file share entity that depends on a file server entity; and a host entity that depends on a logical device entity. The system may be a data storage system. Metadata may identify dependencies between pairs of entities. The proactive consistency validation processing of the configuration information may detect an inconsistency in the configuration information if the metadata indicates that a first entity of a first type depends on a second entity of a second type and the configuration information includes an instance of the first entity of the first type and does not include an instance of the second entity of the second type. The one or more defined time periods may be included in a defined schedule of times at which the proactive consistency validation processing is to be performed. The plurality of defined trigger events may include any of: a user specified or initiated trigger, a critical or important event occurrence, prior to performing an upgrade to software on the system, and prior to performing an upgrade to hardware on the system.

In accordance with another aspect of the techniques herein is a system comprising: at least one processor; and a memory comprising code stored thereon that, when executed, performs a method of detecting configuration inconsistencies comprising: receiving notification regarding an occurrence of a trigger event in a system, wherein the trigger event is one of a plurality of defined trigger events, and wherein the plurality of defined trigger events include one or more defined time periods; and responsive to receiving the notification, performing first processing including: capturing configuration information describing a current configuration of the system; and performing proactive consistency validation processing of the configuration information that detects inconsistencies between dependent entities of the current configuration.

In accordance with another aspect of techniques herein is a computer readable medium comprising code stored thereon that, when executed, performs a method of detecting configuration inconsistencies comprising: receiving notification regarding an occurrence of a trigger event in a system, wherein the trigger event is one of a plurality of defined trigger events, and wherein the plurality of defined trigger events include one or more defined time periods; and responsive to receiving the notification, performing first processing including: capturing configuration information describing a current configuration of the system; and performing proactive consistency validation processing of the configuration information that detects inconsistencies between dependent entities of the current configuration. The proactive consistency validation processing may include detecting inconsistencies between dependent entities of a same type. The proactive consistency validation processing may include detecting inconsistencies between a first license that depends on a second license. The proactive consistency validation processing may include detecting inconsistencies between any of: a deduplication license that depends on a file license; a data compression license that depends on a file license; a data compression license that depends on a thin or virtual provisioning license; a snapshot license that depends on a thin or virtual provisioning license; a file related feature or service license that depends on a file license; and a block related feature or service license that depends on a block license. The proactive consistency validation processing may include detecting inconsistencies between dependent entities each of a different type. The proactive consistency validation processing may include detecting inconsistencies between any of: a snapshot entity that depends on a logical device entity; a snapshot entity that depends on a file system entity; a replication entity that depends on a logical device entity; a server entity that depends on a pool entity; a file share entity that depends on a file server entity; and a host entity that depends on a logical device entity. Metadata may identify dependencies between pairs of entities, and the proactive consistency validation processing of the configuration information may detect an inconsistency in the configuration information if the metadata indicates that a first entity of a first type depends on a second entity of a second type and the configuration information includes an instance of the first entity of the first type and does not include an instance of the second entity of the second type. The plurality of defined trigger events may include any of: a user specified or initiated trigger, a critical or important event occurrence, prior to performing an upgrade to software on the system, and prior to performing an upgrade to hardware on the system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
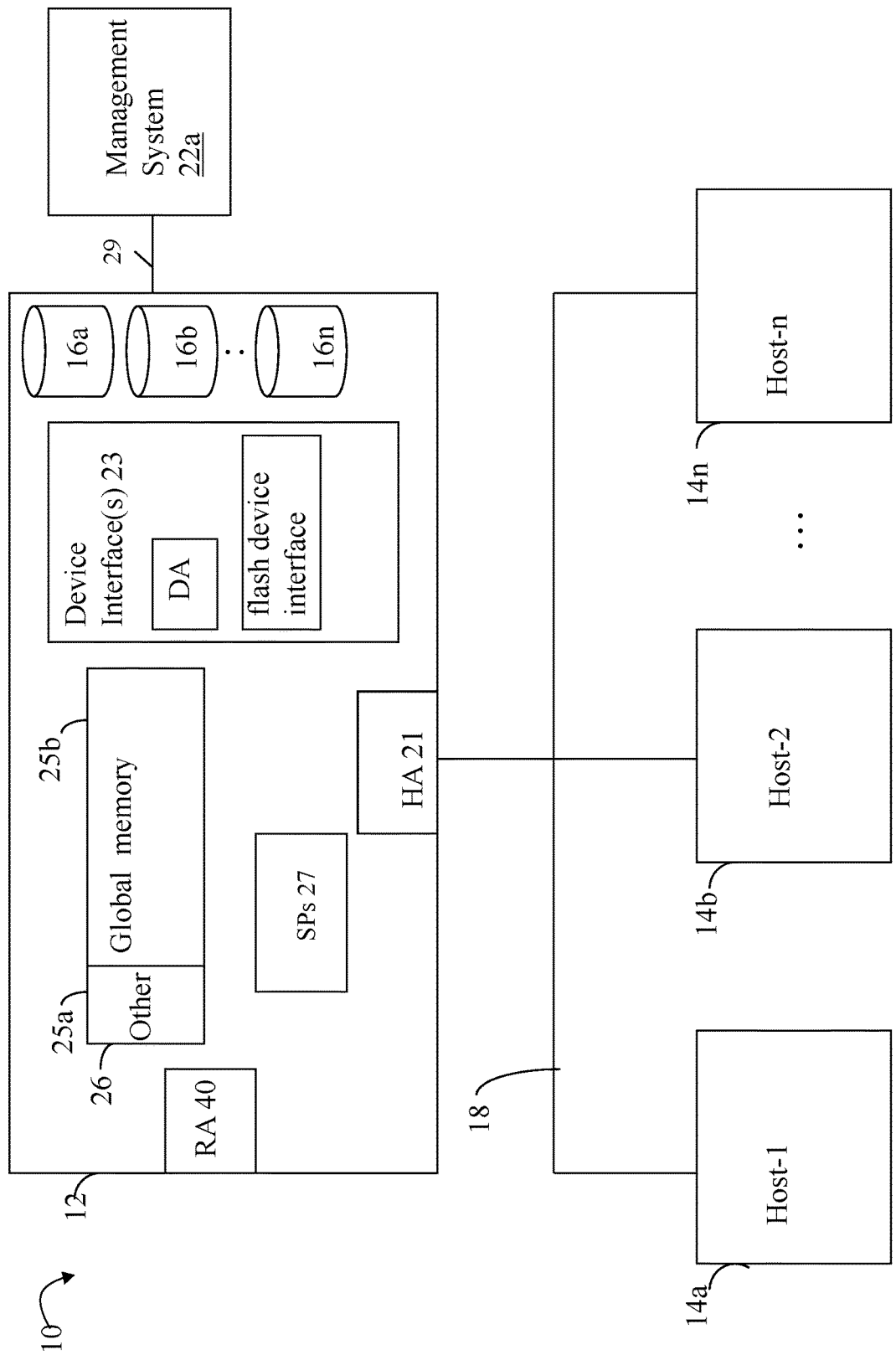
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication connection 18. In this embodiment of the computer system 10, and the n hosts 14a-14n may access the data storage system 12, for example, in performing input/output (I/O) operations or data requests. The communication connection 18 may be any one or more of a variety of networks or other type of communication connections as known to those skilled in the art. The communication connection 18 may be a network connection, bus, and/or other type of data link, such as a hardwire or other connections known in the art. For example, the communication connection 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication connection 18 by any one of a variety of connections as may be provided and supported in accordance with the type of communication connection 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication connection that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication connection 18 may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of physical data storage devices (PDs or physical devices) such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system, or other device as described in more detail elsewhere herein, where such system or device 22a includes data storage system management software or application such as may execute in a web browser. The system 22a may communicate with the data storage system 12 over any suitable connection 29. Generally, element 29 may be a network connection such as a public internet connection, private intranet connection, and the like. Element 29 may, for example, be any suitable connection similar to the connection 18 described elsewhere herein.

A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Each of the different adapters, such as HA 21, DA or disk interface, RA, and the like, may be implemented as a hardware component including, for example, one or more processors, one or more forms of memory, and the like. Code may be stored in one or more of the memories of the component for performing processing.

An embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI or block-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, create a new logical entity (e.g., RAID group, storage pool), view information on physical and/or logical data entities in a current data storage system configuration (e.g., status and health of physical storage devices, amount of free/available storage in a provisioned LUN, pool, or RAID group) and the like. For example, commands may be issued over the control path to provision storage for LUNs from a RAID group or storage pool (e.g., logically defined group of physical storage devices), create a snapshot of a LUN, file system, or other logical entity, define conditions of when to create another snapshot, delete a snapshot, define or establish local and/or remote replication services for a logical entity (e.g., file, file system, LUN), define or modify a schedule for snapshot or other data replication services, define/create a RAID group or storage group (e.g., configured from selected physical storage devices), obtain data storage management and configuration information for display, generally modify one or more aspects of a data storage system configuration, and the like.

The data storage system may provide different storage services. For example, the system may provide a snapshot service that creates snapshots with respect to a provisioned storage entity, such as a LUN, file system, file, and the like. As known in the art, a snapshot may be characterized as a point in time logical image of data. In connection with LUNs, software of a data storage system may provide one or more data replication services or facilities whereby a snapshot is one such facility that may be used to create point in time snapshot of production data for non-disruptive backup. A snapshot may be made with respect to a source LUN thereby providing a point in time image of the source LUN. A snapshot may appear like a normal LUN and may be used for backup, testing, and the like. Snapshots may rely, for example, on copy on first write (COFW) and other techniques to track source LUN changes from the time when a snapshot was created. Any writes to the source LUN may result in processing by snapshot software, for example, to copy the original data prior to changes into another area of storage. With respect to COFW techniques, the COFW occurs only once for each data block modified on the source LUN. Since only changed data blocks of the source LUN are retained rather than make a complete copy of the source LUN, the storage capacity required to implement snapshots may be considerably less than that of the source LUN. Though a LUN snapshot may be presented to a user as a separate LUN along with the current source LUN, a snapshot of a LUN is a virtual point in time copy and requires access to the unchanged data in the source LUN. Therefore failures affecting the source LUN also affect the snapshot of the LUN. Snapshots of a LUN may be contrasted, for example, bit-for-bit replica data copies of a source LUN. In connection with the foregoing, COFW is only one example of technology that may be used in connection with snapshots. More generally, any suitable technique may be used in connection with snapshot creation and techniques described herein.

Snapshots may be made of a source LUN, for example, on demand, according to a schedule, such as daily or at other predefined times, or, more generally, based on one or more trigger conditions or events occurring. The data storage system management software may be used in connection with configuring and defining various aspects of providing snapshot service, and more generally, providing replication services or data protection services.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

As mentioned elsewhere herein, there are various physical and logical data storage entities existing in a data storage system configuration. For example, there are various storage entities, such as pools, LUNs, file systems, physical storage devices, and the like. Some entities have one or more dependencies on other storage entities. For example, storage for a LUN, such as LUN 1, may be provisioned from a pool, such as POOL1, whereby the LUN 1 cannot exist if the pool POOL1 is deleted. Thus, the LUN 1 logical entity depends on the particular pool entity, POOL 1. In accordance with techniques herein, the dependency between LUN 1 and POOL 1 may be determined as consistent if both entities exist. However, if POOL 1 entity does not exist while LUN 1 entity does exist, then the configuration may be determined to have an inconsistency or inconsistent state. An inconsistency in the data storage configuration with respect to dependent storage entities may be detected, for example, by determining whether all instance of the entities of the dependency exist. Put another way, a first instance of a first entity such as LUN1 may have a dependency on a second instance of a second entity, such as POOL 1. In such a specified dependency, a reference is made to LUN 1 and POOL 1 and the consistency checking may perform processing to ensure that each referenced instance of an entity of the dependency also exists in the data storage system configuration. If all dependencies are met whereby all referenced instances and entities of the dependencies exist, then the data storage system configuration may be characterized as validated and consistent. Otherwise, the data storage system may be characterized as inconsistent and not passing the validation or consistency check.

In some existing system, a consistency check with respect to the data storage system configuration dependencies may be performed when the user performs configuration operations such as, for example, operations to create or define an entity that depends on the existence of another entity. If a first configuration operation is not completed properly, for example, such as due to another problem or state of the data storage system during the first configuration operation, the data storage system configuration may be left in an inconsistent state. The inconsistent state may be detected until subsequent configuration operations are performed which use or reference the same storage entities of the first configuration operation. In other words, in some existing systems, data storage system consistency checking and validation may be performed when a configuration operation is performed. Such consistency checking may be also only be performed with respect to the particular storage entity instances referenced in the configuration operation performed. The inconsistent configuration may be characterized as a vulnerability whereby the system and its data have a potential risk of Data Unavailable/Data Loss in the data storage system. (e.g., a host may continue attempts to write files to a LUN configured in a non-existent pool).

In accordance with techniques herein described in following paragraphs, processing may be performed to proactively detect any inconsistency of the data storage system configuration. Once the inconsistency is detected, processing may be performed, for example, to notify the user with recommended actions, or notify the service provider if the inconsistency issue is complex which requires additional knowledge and/or expertise such as of support expert.

In at least one embodiment in accordance with techniques herein, the data storage system configuration information may include metadata that identifies the various types of data storage system configurations, such as pool, LUN, file system, license, and the like, as well as the dependency relationship among the various instances of the configuration entities. Additionally, a current data storage system configuration may be captured at a point in time based on the metadata. Processing may then be performed of the captured data storage system configuration to determine whether the configuration is consistent with respect to dependences among data storage system entities of the configuration. The captured storage system configuration data may be based on the metadata. In following examples, each instance of a storage entity type has a unique id attribute. The instances which have dependencies also include their dependency as an attribute. The foregoing are described in more detail in following paragraphs.

Figure 2:
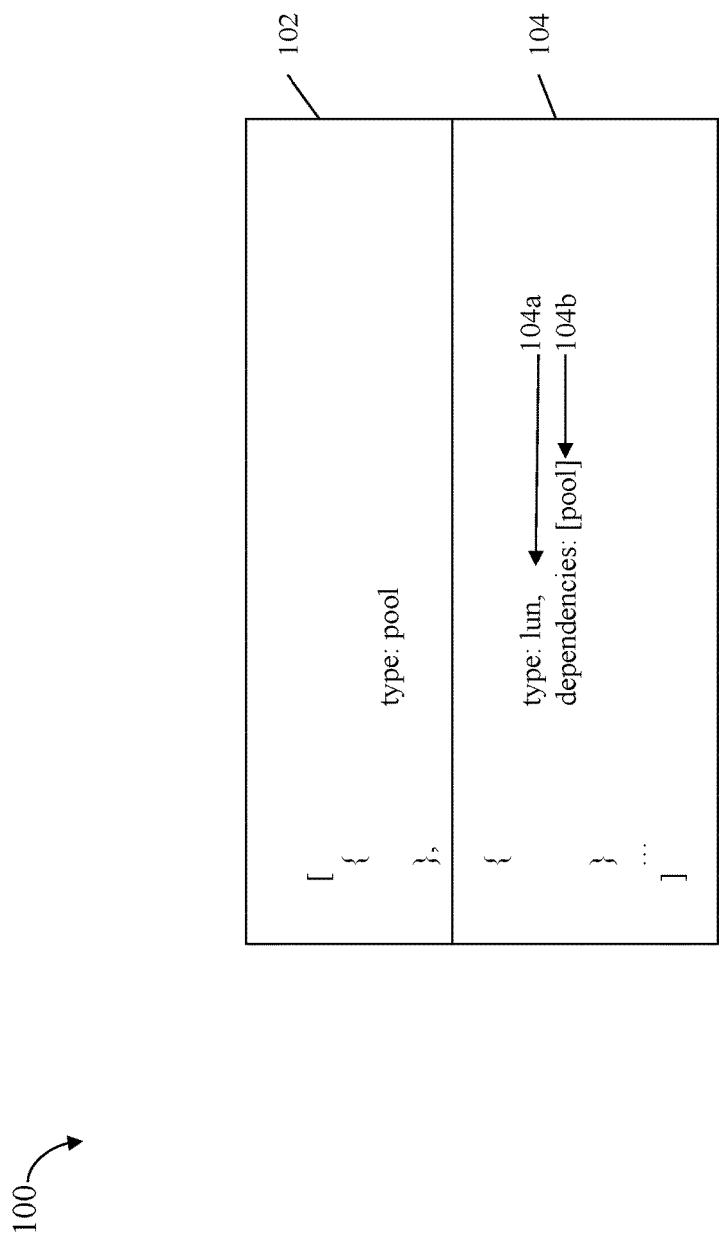
FIGS. 2 and 5 are examples of metadata that may be used in an embodiment in accordance with techniques herein.

Referring to FIG. 2, shown is an example 100 of information that may be included in the metadata in an embodiment in accordance with techniques herein. The example 100 identifies the different entities and dependencies between entities that may be included in a data storage system configuration. The metadata of the example 100 may include portion 102 identifying the pool storage entity and portion 104 identifying the LUN storage entity. Element 102 indicates that each pool entity does not have a dependency. Element 104 indicates that each LUN entity (104a) has an associated dependency (104b) on a pool entity. Thus, element 104 expresses the logical entity LUN and its dependency on a pool whereby each LUN is configured from, or has its storage provisioned from, another logical entity, the storage pool (pool entity). In at least one embodiment, the pool may be configured as a logical group of one or more physical storage devices. The example 100 indicates the possible dependencies between entities that may be included in a data storage configuration.

The example 100 may be metadata storage in a file having a defined structure such as illustrated. Generally, any suitable structure may be used. More generally, the metadata information 100 may be incorporated into any suitable storage container and is not limited to a file.

Figure 3:
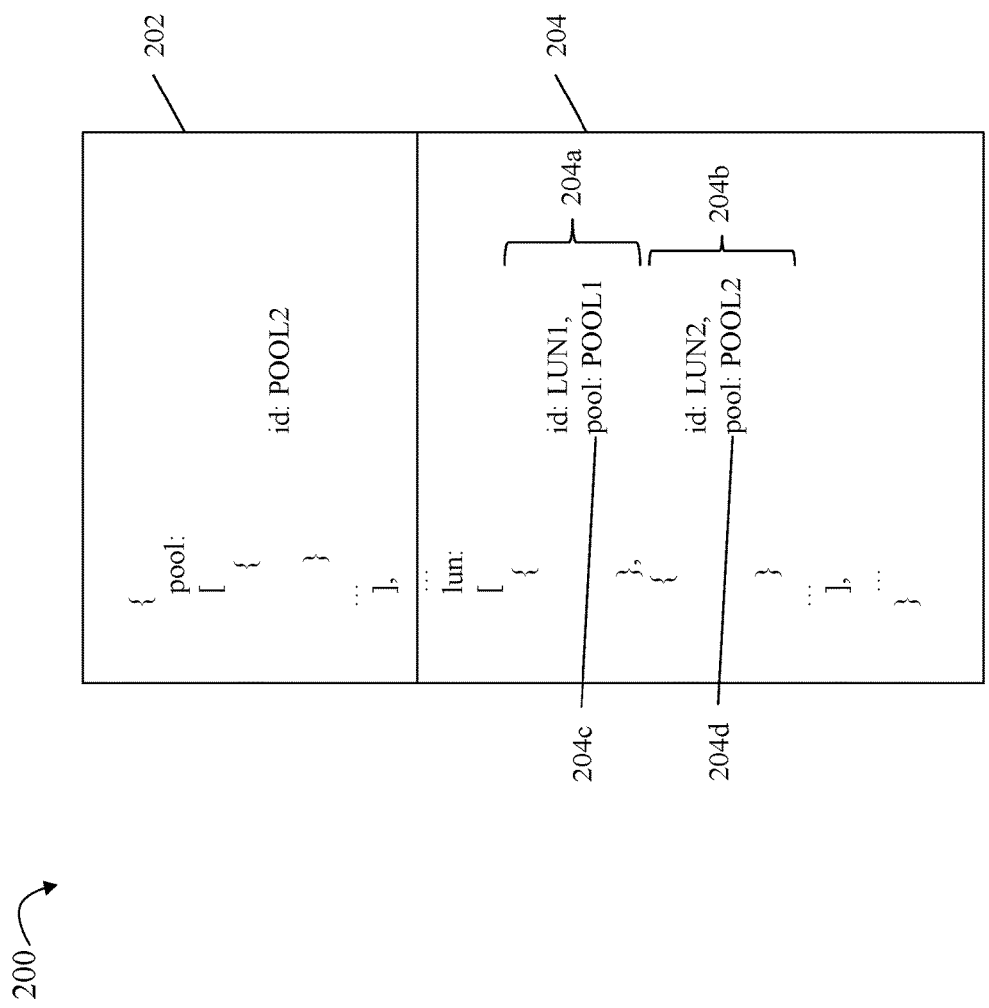
FIGS. 3, 3B, 6, and 7 are examples of captured configuration data that may be used in an embodiment in accordance with techniques herein.

Referring to FIG. 3, shown is an example 200 of data storage system configuration data that may be used to describe a current data storage system configuration in an embodiment in accordance with techniques herein. The example 200 may represent the captured data storage system configuration denoting those instances of different data storage entities in a defined configuration at a point in time. The example 200 is based on the metadata from the example 100 identifying the entities of types pool and LUN and the dependency between the LUN and pool entities. At a point in time, processing may be performed to capture the currently defined data storage system configuration whereby such configuration may be expressed in a structured file format as illustrated in the example 200. The example 200 identifies particular existing instances of the different storage entities currently defined and in existence in the data storage system configuration at the time the capture operation is performed. Generally, the capture operation may be characterized as recording information describing the currently defined data storage system configuration. The example 200 is one way in which the captured configuration may be described.

Element 202 denotes a portion of the captured configuration information of one or more pool instances currently defined in the system. In this example, there is only a single pool, POOL2, currently defined in the configuration. Each instance of a storage entity has its own unique identifier (id) that is an attribute of the storage entity. For example, with reference to 202, POOL2 is the id attribute that uniquely identifies the particular single pool instance.

Element 204 denotes another portion of the captured configuration information of one or more LUN instances currently defined in the system. Consistent with the dependencies described by the metadata of FIG. 2, each instance of a storage entity type has a unique id attribute and the instances which have dependencies also include their dependency as an attribute. Element 204a describes a first LUN instance having the id LUN1 where LUN1 has its storage provisioned from (e.g., is configured from) pool entity POOL1. Thus, line 204c identifies the foregoing dependency between entities LUN1 and POOL1 (as generally denoted by 104a, 104b of FIG. 2). Element 204b describes a second LUN instance having the id LUN2 where LUN2 has its storage provisioned from (e.g., is configured from) pool entity POOL2. Thus, line 204d identifies the foregoing dependency between entities LUN2 and POOL2 (as generally denoted by 104a, 104b of FIG. 2).

The configuration information 200 as described above indicates in 202 that only a single pool, POOL2, is currently configured. Yet the configuration also has LUN instances configured from two different pools, POOL1 (204c) and POOL2 (204d). In accordance with techniques herein, processing may be proactively performed to detect the inconsistency between dependent entities 204a whereby LUN 1 is configured from the non-existent pool POOL1.

In at least one embodiment, the configuration information 200 may be captured at a desired point in time, such as based on a schedule or other trigger event occurrence. The captured configuration data 200 may be generally captured responsive to an occurrence of a defined trigger event whereby the data 200 may be analyzed to determine any consistency between dependent storage entities. In this manner, the data storage system configuration data may be processed to proactively provide for consistency validation.

Figure 4:
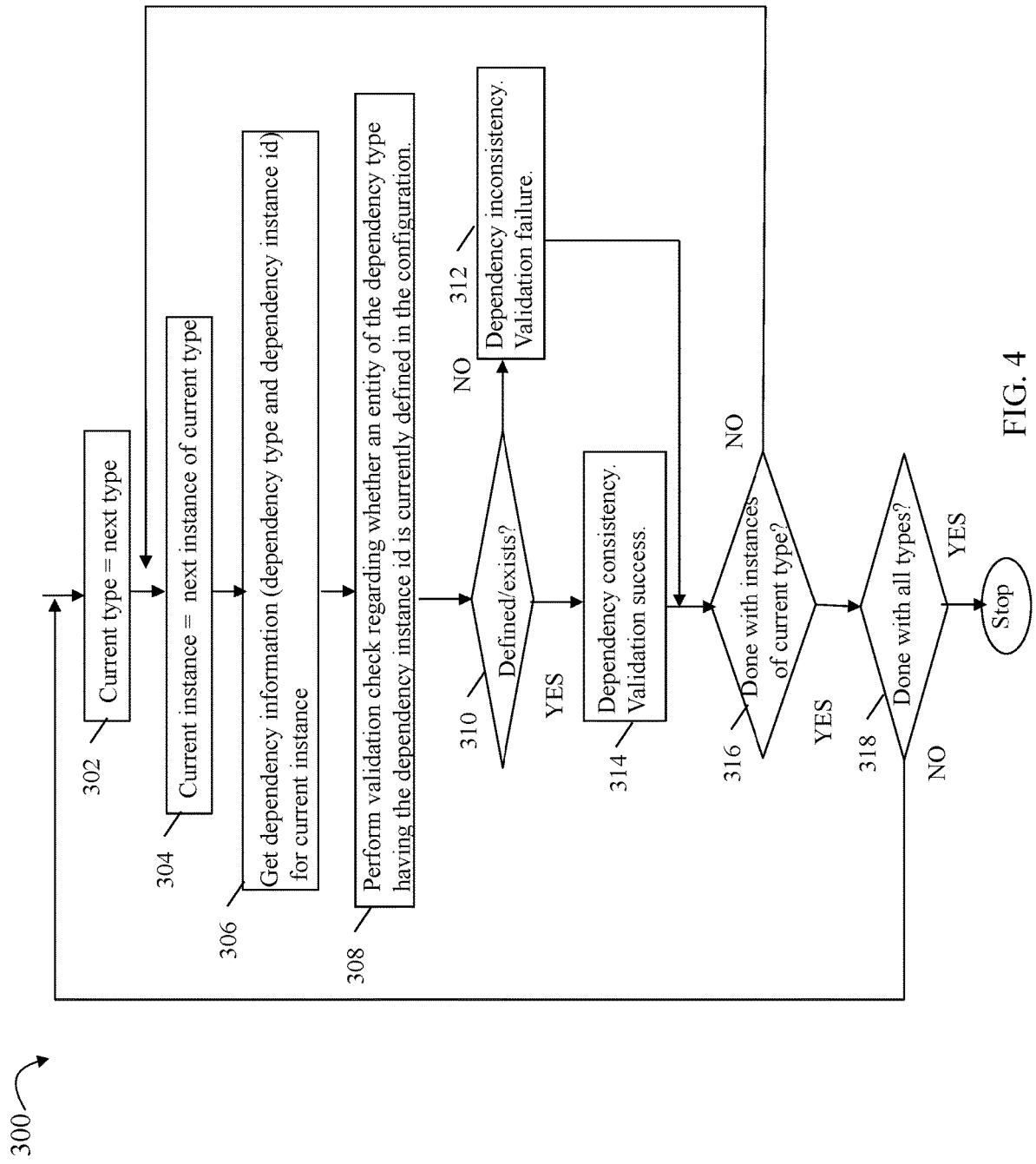
FIGS. 4 and 8 are flowcharts of processing steps that may be performed in an embodiment in accordance with techniques herein.

Referring to FIG. 4, shown is a flowchart 300 of processing steps that may be performed in an embodiment in accordance with techniques herein for proactive storage system configuration consistency validation processing. The flowchart 300 outlines steps that may generally be performed to detect dependency inconsistencies with respect to dependent entities in a data storage system configuration data set, such as illustrated in FIG. 3. The flowchart 300 processing may be performed, for example, to detect the above-noted inconsistency of 204a where LUN1 is defined as an existing LUN configured from POOL1 and whereby POOL1 does not exist in the current configuration as described by the configuration data in the example 200. The processing of flowchart 300 generally traverses the configuration data file and identifies each entity type. For each entity type in the configuration data, and for each instance of the entity type for which there is a dependency on another second entity, a check is performed to determine whether the particular instance of the second entity exists/is defined in the current configuration.

At step 302, current type is assigned the next type in the configuration data for which dependencies may be defined (e.g., such as expressed in the metadata 104a, 104b of the metadata information in FIG. 2). With reference to the example 100 of FIG. 2, the defined types are pool and LUN and the entity of type LUN is denoted in 104 as having a dependency on a pool entity. As identified by 102, each pool entity does not have a dependency so no consistency checking or validation with respect to dependent entities is performed. In this case, processing of step 302 begins with portion 204 of the captured configuration data for LUN entity instances. Thus, execution of step 302 assigns current type=LUN.

At step 304, current instance is assigned the next LUN instance identified in the configuration data 200. Thus, step 304 results in current instance=LUN1. At step 306, dependency information is obtained for the current instance, LUN1. The dependency information includes the dependency type and dependency instance id. As denoted by 204c for LUN1, the dependency type=pool and the dependency instance id=POOL1. Step 308 performs processing for the validation check regarding whether an entity of the dependency type (e.g., pool) having the dependency instance id (e.g., POOL1) is currently defined in the configuration.

At step 310, a determination is made as to whether the entity of the dependency type having the dependency instance id is currently defined in the configuration. If step 310 evaluates to no, control proceeds to step 312 where a dependency inconsistency is determined resulting in a validation failure. Control then proceeds to step 316. If step 310 evaluates to yes, control proceeds to step 314 where the dependency is determined to be consistent resulting in validation success. Control then proceeds to step 316. In this example, there is no POOL1 so step 310 evaluates to no and to step 312 to detect the dependency inconsistency with respect to POOL1 and LUN1.

At step 316, a determination is made as to whether processing is complete for all instances of the current type. If step 316 evaluates to no, control proceeds to step 304 to process the next instance of the current type. If step 316 evaluates to yes, control proceeds to step 318. In this example, the current type=LUN and processing has just completed for LUN 1 described by 204a and there is one remaining LUN to be processed as described by 204b. Accordingly, step 316 evaluates to no in this example and processing continues with step 304 where current instance is then advanced to the next LUN instance, LUN 2, for processing. Processing for LUN2 may be performed by executing steps 306, 308 and 310 in a manner as described above but with respect to the particular dependency information of 204b. In connection with LUN2, step 310 evaluates to yes since POOL2 does exist (as denoted by 202). For LUN2, processing proceeds to step 314 and then step 316 where step 316 then evaluates to yes since LUN2 is the last LUN entity instance in the configuration data 200. Since step 316 evaluates to yes in this example, control then proceeds to step 318 where a determination is made as to whether there are any remaining entity types having dependencies remaining in the captured configuration data. If step 318 evaluates to no, control proceeds to step 302 to process the next type of entity. If step 318 evaluates to yes, processing of the captured configuration data stops. In this example with reference to FIG. 3, after processing LUN2, step 318 evaluates to yes whereby dependency checking stops.

Thus, the processing steps of FIG. 4 may be performed to detect that POOL1 does not exist this the existence of LUN1 is inconsistent since the pool instance, POOL1, from which LUN1 is configured/has its storage provisioned, does not exist. Generally, the foregoing inconsistency may be characterized as a detected dependency inconsistency between LUN1 and POOL1.

Figure 3B:
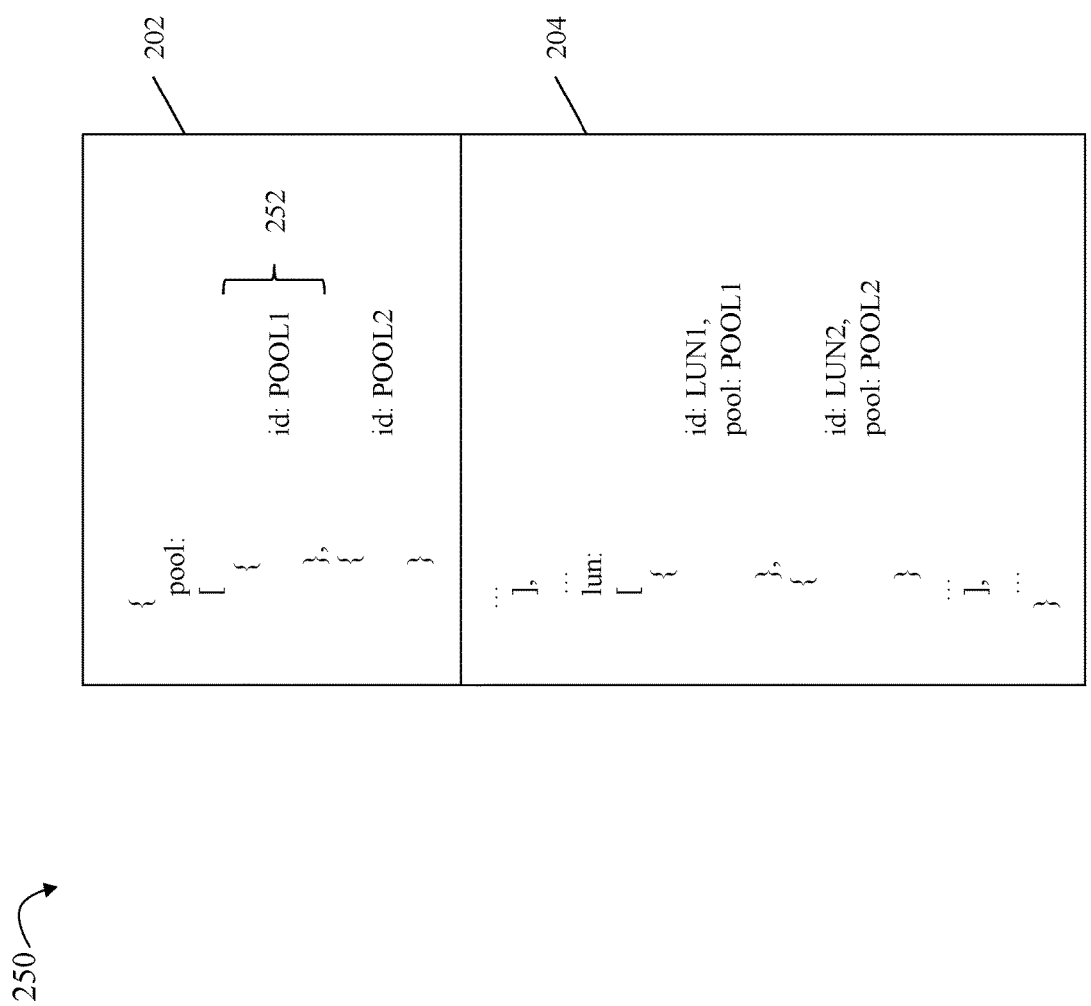

Referring to FIG. 3B, for completeness, shown is a revised version of the captured configuration information from FIG. 3. The example 250 includes the captured configuration information as illustrated in the example 200 of FIG. 3 with the addition of information 252 identifying a defined instance of POOL1. Thus, element 250 is an example a captured configuration which is consistent with respect to dependent entities since LUN1 is now configured in a defined and existing pool instance, POOL1, as identified by 252.

The flowchart of FIG. 4 processing may be performed to detect dependency inconsistencies between two entities of different types or two entities of the same type. An embodiment in accordance with techniques herein may similarly have a captured data storage system configuration with other dependencies between other entities of different types. Following are additional examples of dependencies between different data storage entities that may be included in a data storage system configuration (e.g., as described by captured information of FIG. 3) where such dependencies may be expressed in the metadata, such as illustrated in FIG. 2:

a snapshot entity may be dependent on a LUN entity (e.g., a snapshot is taken of the LUN);

a snapshot entity may be dependent on a file system entity (e.g., a snapshot is taken of the file system);

a snapshot entity may be dependent on a file (e.g., a snapshot is taken of the file);

a replication entity may be dependent on a LUN entity;

a NAS (Network Attached Storage) server entity may be dependent on a pool entity;

a file system entity may be dependent on a NAS server entity;

an SMB (Server Message Block) share entity or NFS (Network File System) share entity may be dependent on a NAS server entity (e.g., file share entity depends on a file server entity); and a host entity may be dependent on a LUN entity (e.g., where the host issues I/Os to the LUN and the LUN generally stores data used by the host and applications executing on the host).

In connection with the foregoing, SMB is a network file sharing protocol that allows applications on a computer to read and write to files and to request services from server programs in a computer network. The SMB protocol can be used on top of its TCP/IP protocol or other network protocols. The SMB protocol is used by various Window-based operating systems to share files, printers, serial ports, and communicate this information between computers by using named pipes and mail slots. NFS is a distributed filesystem protocol that enables users to mount remote directories on their server. A file share, such as an NFS or SMB share, is known in the art and may denote, for example, one or more folders which are shared among multiple users.

In at least one embodiment in accordance with techniques herein, there may be a dependency between two entities of the same type as well as different types. For dependencies between same type entities, consider license dependencies as illustrated in the following examples.

Figure 5:
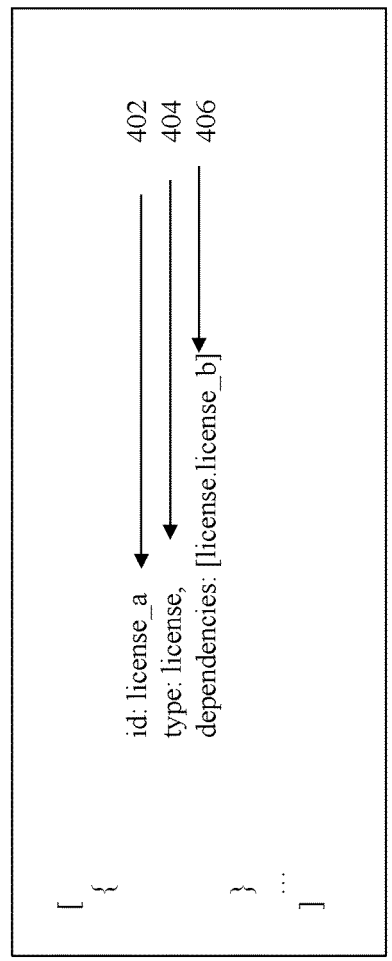

Referring to FIG. 5, shown is an example of additional metadata that may be defined in an embodiment in accordance with techniques herein. The example 400 may be metadata used in an embodiment in addition to metadata, such as described and illustrated in FIG. 2. Thus, the example 400 illustrates metadata describing a dependency between two licenses. In particular, the example 400 indicates that license_a (402) is of type license (404) and it has a dependency (406) on a license instance of id license_b. The example 400 illustrates a dependency between two license instances, license_a instance and license_b instance. To further illustrate, a data storage system may provide two different licensed services dependent on one another. For example, a data storage system may offer file services of a file system where a user may perform various different file operations known in the art (e.g., create files, read from and write to files, delete files, and the like). Additionally, the data storage system may offer other data services such as data deduplication. As known in the art, data deduplication techniques attempt to eliminate storing duplicate copies of data and rather store a single instance of each unique data item or data portion. As such, data deduplication may be performed with respect to files whereby a deduplication license for data deduplication services may depend on a file service license. Data deduplication may be performed with respect to a logical data storage entity type, such as a file, where a first license is required for data deduplication and a second different license is required for file services (e.g., data deduplication license has a dependency on the file services license).

Figure 6:

Referring to FIG. 6, shown is an example of information that may be captured as part of a data storage system configuration in an embodiment in accordance with techniques herein. The example 500 includes data that may be captured and that describes a current data storage configuration similar to captured configuration data of FIG. 3. The example 500 specifies that only a single license instance, license_a (502), is defined in a currently captured configuration, where there is no license with id license_b. Thus, processing may be performed in an embodiment in accordance with techniques herein for proactive dependency consistency checking and validation to detect the foregoing inconsistency. The processing steps performed may be those as described generally in connection with FIG. 4.

Figure 7:
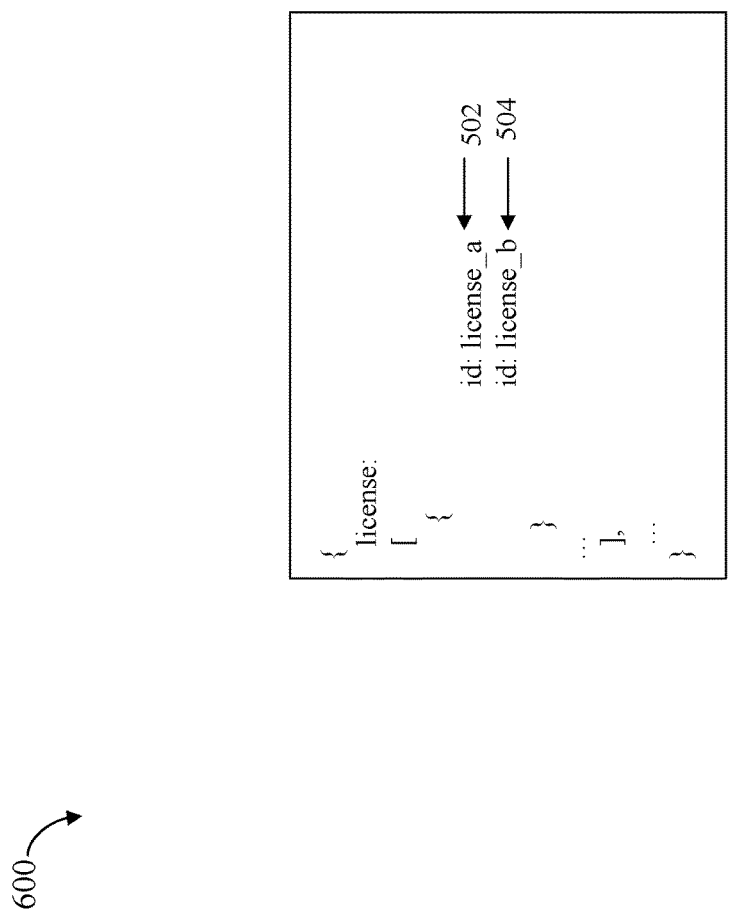

It should be noted that, for completeness, reference is made to FIG. 7 which illustrates a version of the captured configuration information from FIG. 6 further modified to include new line 504. The example 600 of FIG. 7 illustrates a consistent configuration with a consistent dependency defined between license_a 502 and license_b 504.

Following are additional examples of other license dependencies that may be included in a data storage system configuration (e.g., as described by captured information such illustrated in FIGS. 6 and 7) where such dependencies may be expressed in the metadata, such as illustrated in FIG. 5:

Compression license (e.g., to perform data compression) may be dependent on a file license;

Compression license may be dependent on thin or virtual provisioning license;

Snapshot license may be dependent on thin or virtual provisioning license;

All file related features/services licenses may be dependent on a file license; and All block related features/services license may be dependent on a block license.

In connection with the foregoing, a data storage system may support one or more different types of logical devices presented as LUNs. For example, a data storage system may provide for configuration of thick or regular LUNs and also virtually provisioned or thin LUNs (e.g., created by thin or virtual provisioning). A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity. The granularity or the amount of storage provisioned at a time for virtually provisioned LUN may vary with embodiment. In one embodiment, physical storage may be allocated, such as a single allocation unit of storage, the first time there is a write to a particular target logical address (e.g., LUN and location or offset on the LUN). The single allocation unit of physical storage may be larger than the size of the amount of data written and the single allocation unit of physical storage is then mapped to a corresponding portion of the logical address range of a LUN. The corresponding portion of the logical address range includes the target logical address. Thus, at any point in time, not all portions of the logical address space of a virtually provisioned device may be associated or mapped to allocated physical storage depending on which logical addresses of the virtually provisioned LUN have been written to at a point in time.

Thin devices and thin provisioning, also referred to respectively as virtually provisioned devices and virtual provisioning, are described in more detail, for example, in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

As described herein, the configuration consistency validation may be performed proactively upon the occurrence of one or more defined trigger events. Following describes examples of such defined triggers that may be included in an embodiment in accordance with techniques herein. The configuration capture and consistency validation may be performed based on the occurrence of a periodically defined validation time. For example, the configuration capture and validation processing may run periodically on the data storage system. The particular points in time when the configuration capture and then validation and consistency checking may be performed may be in accordance with a defined schedule. For example, an embodiment may define a schedule on a time-basis (e.g., daily, weekly, hourly, specified times of the day or week) when the current data storage system configuration information (e.g., as in FIGS. 3, 3B, 6 and 7) is captured and then processed for consistency validation of dependent entities (e.g., FIG. 4 processing). As a variation, the capture and also the consistency validation may be performed as a background process periodically during times of when the system is idle or has low CPU usage.

As another example, an embodiment may define one or more auto-trigger events that automatically result in performing the configuration capture and consistency validation. For example, upon the occurrence of one or more defined critical or important events (e.g., such as detected by an event logger or monitor) which may impact the stability of storage, normally the system will capture a collection of system status, including logs, configuration etc. At that time, the configuration capture and consistency validation may be executed. Generally, events may be classified by type whereby the configuration capture and consistency validation may be performed responsive to the occurrence of one of the critical or important events.

As another example, the configuration capture and consistency validation may be performed before upgrading or updating the storage system software and/or hardware, or more generally, prior to performing one or more specified operations such as an upgrade (e.g., upgrade to storage system operating system, driver, micro code, firmware, and the like). The configuration capture and consistency validation check may be performed prior to major operations to ensure the system configuration is generally in a consistent and valid state.

As another example, the configuration capture and consistency validation may be performed based on a user trigger or at the request of a user, such as through a user interface option. For example, a user may select, via the user interface command, menu option, and the like, to perform the configuration capture and consistency validation.

The foregoing as described herein are examples of triggers that may be defined that result in performing the configuration capture and consistency validation processing as described herein. Thus, techniques herein provide for proactively checking the consistency of the storage system configuration. As a result, such processing may detect any configuration inconsistency in a timely manner. An embodiment may also notify a user when any such inconsistency is detected (e.g., as in step 312 of FIG. 4) to take corresponding actions. Alternatively or additionally, a service provider may be notified if the inconsistency detected requires support expert's involvement. Thus, earlier proactive detection of any such inconsistencies in the configuration with respect to dependent storage entities may result in reducing the possibility of data unavailability and/or data loss which may otherwise result from failure to detect the inconsistency in a timely manner.

Figure 8:
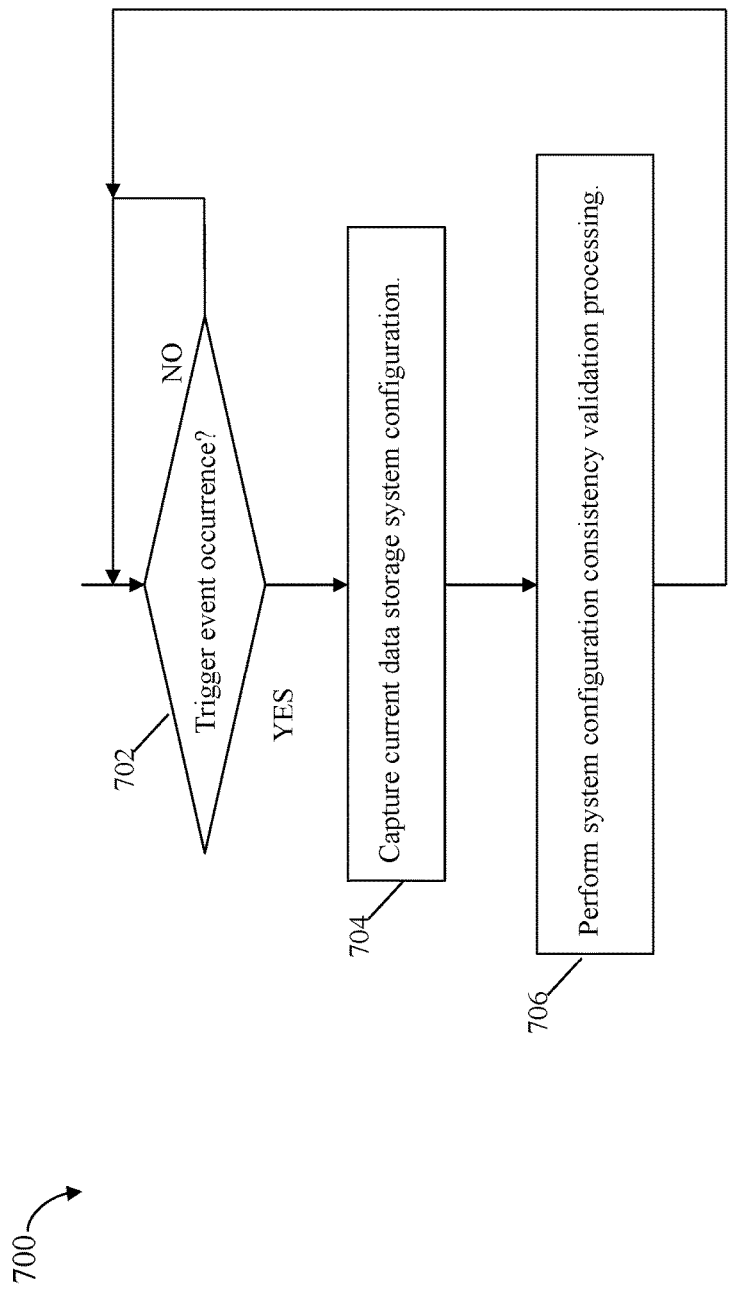

Referring to FIG. 8, shown is another flowchart of processing steps that may be performed in an embodiment in accordance with techniques herein. The flowchart 700 summarizes processing described above. At step 702, a determination is made as to whether a defined trigger event has occurred. Processing remains at step 702 until step 702 evaluates to yes. Once step 702 evaluates to yes, processing proceeds to step 704. At step 704, processing is performed to capture the current data storage system configuration. From step 704, control proceeds to step 706. At step 706, the system configuration consistency validation processing is performed. Step 706 processing is described, for example, in connection with FIG. 4 and also in connection processing the captured configuration information of FIGS. 3, 3B, 6 and 7 to detect inconsistencies between dependent storage entities. Step 706 may also include taking any desired actions and providing any suitable notifications to users responsive to detecting any inconsistency in the captured configuration information. From step 706, control proceeds to step 702 to wait for the next occurrence of a trigger event.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of detecting configuration inconsistencies comprising:
 receiving, using a processor, a notification regarding an occurrence of a trigger event in a data storage system, wherein the trigger event is one of a plurality of defined trigger events, and wherein the plurality of defined trigger events includes: one or more defined time periods, prior to performing an upgrade to software on the data storage system, and prior to performing an upgrade to hardware on the data storage system; and
 responsive to receiving the notification, performing first processing using a processor, the first processing including:

capturing configuration information describing a current configuration of the data storage system, wherein the current configuration includes existing licenses for software services in the data storage system, includes existing logical storage entities in the data storage system, and includes existing physical storage entities in the data storage system;

responsive to capturing the configuration information, performing proactive consistency validation processing of the configuration information that describes the current configuration of the data storage system, wherein the proactive consistency validation processing of the configuration information detects inconsistencies between dependent entities of the current configuration of the data storage system as described in the configuration information that is captured in response to the occurrence of the trigger event, wherein said proactive consistency validation processing includes:

detecting a licensing inconsistency between a first software service license that depends on existence of a second software service license, wherein the licensing inconsistency is detected responsive to determining that the first software service license exists in the configuration information describing the current configuration of the data storage system and that the second software service license does not exist in the configuration information describing the current configuration of the data storage system; and detecting a storage entity inconsistency between a first storage entity that is a first logical device that depends on existence of a second storage entity that is a first storage pool, wherein the storage entity inconsistency is detected responsive to determining that the first storage entity that is the first logical device exists in the configuration information describing the current configuration of the data storage system and that the second storage entity that is the first storage pool does not exist in the configuration information describing the current configuration of the data storage system;

responsive to detecting the licensing inconsistency, performing a first action using a processor to correct the licensing inconsistency, wherein the first action includes updating the current configuration of the data storage system to include the second software service license; and responsive to detecting the storage entity inconsistency performing a second action using a processor to correct the storage entity inconsistency, wherein the second action includes updating the current configuration of the data storage system to include the first storage pool.

2. The method of claim 1, wherein said proactive consistency validation processing includes detecting one or more inconsistencies between dependent entities of a same type.

3. The method of claim 2, wherein said proactive consistency validation processing includes detecting one or more inconsistencies between any of:
a deduplication license that depends on a file license;
a data compression license that depends on a file license;
a data compression license that depends on a thin or virtual provisioning license;
a snapshot license that depends on a thin or virtual provisioning license;
a file related feature or service license that depends on a file license; and
a block related feature or service license that depends on a block license.

4. The method of claim 1, wherein said proactive consistency validation processing includes detecting one or more inconsistencies between dependent entities each of a different type.

5. The method of claim 4, wherein said proactive consistency validation processing includes detecting one or more inconsistencies between any of:
a snapshot entity that depends on a logical device entity;
a snapshot entity that depends on a file system entity;
a replication entity that depends on a logical device entity;
a server entity that depends on a pool entity;
a file share entity that depends on a file server entity; and
a host entity that depends on a logical device entity.

6. The method of claim 1, wherein metadata identifies dependencies between pairs of entities.

7. The method of claim 6, wherein the proactive consistency validation processing of the configuration information detects an inconsistency in the configuration information if the metadata indicates that a first entity of a first type depends on a second entity of a second type and the configuration information includes an instance of the first entity of the first type and does not include an instance of the second entity of the second type.

8. The method of claim 1, wherein the one or more defined time periods are included in a defined schedule of times at which the proactive consistency validation processing is to be performed.

9. The method of claim 1, wherein the plurality of defined trigger events includes any of: a user specified or initiated trigger, and a critical or important event occurrence.

10. A system comprising:
at least one processor; and
a memory comprising code stored thereon that, when executed, performs a method of detecting configuration inconsistencies comprising:
receiving a notification regarding an occurrence of a trigger event in a data storage system, wherein the trigger event is one of a plurality of defined trigger events, and wherein the plurality of defined trigger events includes: one or more defined time periods, prior to performing an upgrade to software on the data storage system, and prior to performing an upgrade to hardware on the data storage system; and
responsive to receiving the notification, performing first processing including:
capturing configuration information describing a current configuration of the data storage system, wherein the current configuration includes existing licenses for software services in the data storage system, includes existing logical storage entities in the data storage system, and includes existing physical storage entities in the data storage system;
responsive to capturing the configuration information, performing proactive consistency validation processing of the configuration information that describes the current configuration of the data storage system, wherein the proactive consistency validation processing of the configuration information detects inconsistencies between dependent entities of the current configuration of the data storage system as described in the configuration information that is captured in response to the occurrence of the trigger event, wherein said proactive consistency validation processing includes:
    detecting a licensing inconsistency between a first software service license that depends on existence of a second software service license, wherein the licensing inconsistency is detected responsive to determining that the first software service license exists in the configuration information describing the current configuration of the data storage system and that the second software service license does not exist in the configuration information describing the current configuration of the data storage system; and
    detecting a storage entity inconsistency between a first storage entity that is a first logical device that depends on existence of a second storage entity that is a first storage pool, wherein the storage entity inconsistency is detected responsive to determining that the first storage entity that is the first logical device exists in the configuration information describing the current configuration of the data storage system and that the second storage entity that is the first storage pool does not exist in the configuration information describing the current configuration of the data storage system;
  responsive to detecting the licensing inconsistency, performing a first action using a processor to correct the licensing inconsistency, wherein the first action includes updating the current configuration of the data storage system to include the second software service license; and
  responsive to detecting the storage entity inconsistency performing a second action using a processor to correct the storage entity inconsistency, wherein the second action includes updating the current configuration of the data storage system to include the first storage pool.

11. A non-transitory computer readable medium comprising code stored thereon that, when executed, performs a method of detecting configuration inconsistencies comprising:
  receiving a notification regarding an occurrence of a trigger event in a data storage system, wherein the trigger event is one of a plurality of defined trigger events, and wherein the plurality of defined trigger events includes: one or more defined time periods, prior to performing an upgrade to software on the data storage system, and prior to performing an upgrade to hardware on the data storage system; and
  responsive to receiving the notification, performing first processing including:
    capturing configuration information describing a current configuration of the data storage system, wherein the current configuration includes existing licenses for software services in the data storage system, includes existing logical storage entities in the data storage system, and includes existing physical storage entities in the data storage system;
    responsive to capturing the configuration information, performing proactive consistency validation processing of the configuration information that describes the current configuration of the data storage system, wherein the proactive consistency validation processing of the configuration information detects inconsistencies between dependent entities of the current configuration of the data storage system as described in the configuration information that is captured in response to the occurrence of the trigger event, wherein said proactive consistency validation processing includes:
      detecting a licensing inconsistency between a first software service license that depends on existence of a second software service license, wherein the licensing inconsistency is detected responsive to determining that the first software service license exists in the configuration information describing the current configuration of the data storage system and that the second software service license does not exist in the configuration information describing the current configuration of the data storage system; and
      detecting a storage entity inconsistency between a first storage entity that is a first logical device that depends on existence of a second storage entity that is a first storage pool, wherein the storage entity inconsistency is detected responsive to determining that the first storage entity that is the first logical device exists in the configuration information describing the current configuration of the data storage system and that the second storage entity that is the first storage pool does not exist in the configuration information describing the current configuration of the data storage system;
    responsive to detecting the licensing inconsistency, performing a first action using a processor to correct the licensing inconsistency, wherein the first action includes updating the current configuration of the data storage system to include the second software service license; and
    responsive to detecting the storage entity inconsistency performing a second action using a processor to correct the storage entity inconsistency, wherein the second action includes updating the current configuration of the data storage system to include the first storage pool.

12. The non-transitory computer readable medium of claim 11, wherein said proactive consistency validation processing includes detecting inconsistencies between dependent entities of a same type.

13. The non-transitory computer readable medium of claim 12, wherein said proactive consistency validation processing includes detecting one or more inconsistencies between any of:
  a deduplication license that depends on a file license;
  a data compression license that depends on a file license;
  a data compression license that depends on a thin or virtual provisioning license;
  a snapshot license that depends on a thin or virtual provisioning license;
  a file related feature or service license that depends on a file license; and
  a block related feature or service license that depends on a block license.

14. The non-transitory computer readable medium of claim 11, wherein said proactive consistency validation processing includes detecting one or more inconsistencies between dependent entities each of a different type.

15. The non-transitory computer readable medium of claim 14, wherein said proactive consistency validation processing includes detecting one or more inconsistencies between any of:

a snapshot entity that depends on a logical device entity;
a snapshot entity that depends on a file system entity;
a replication entity that depends on a logical device entity;
a server entity that depends on a pool entity;
a file share entity that depends on a file server entity; and
a host entity that depends on a logical device entity.

16. The non-transitory computer readable medium of claim 11, wherein metadata identifies dependencies between pairs of entities, and wherein the proactive consistency validation processing of the configuration information detects an inconsistency in the configuration information if the metadata indicates that a first entity of a first type depends on a second entity of a second type and the configuration information includes an instance of the first entity of the first type and does not include an instance of the second entity of the second type.

17. The non-transitory computer readable medium of claim 11, wherein the plurality of defined trigger events includes any of: a user specified or initiated trigger, and a critical or important event occurrence.

* * * * *